April 8, 1969    R. L. EVENS ET AL    3,436,900
PRE-CLEANER ASSEMBLY FOR AIR INDUCTION SYSTEM
Filed Oct. 3, 1966    Sheet 1 of 3
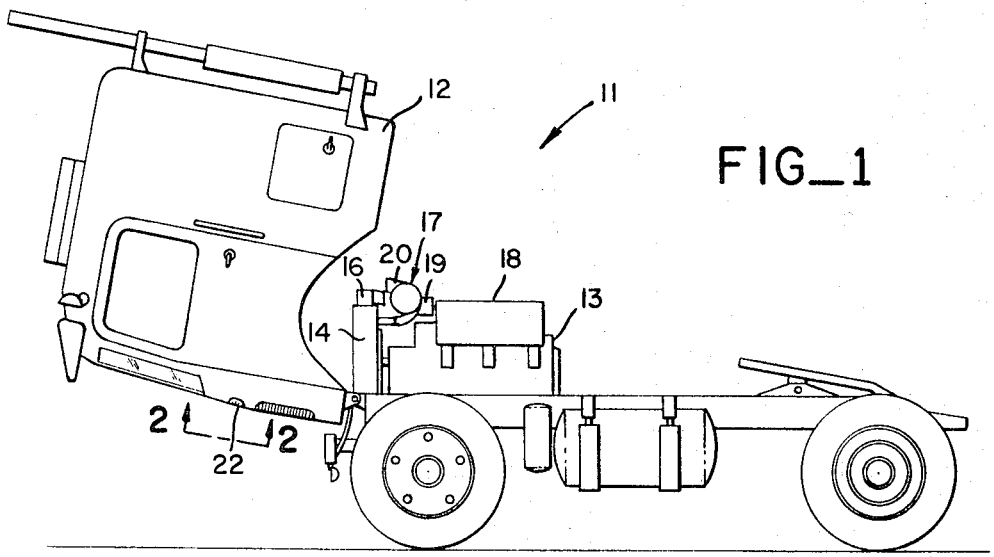
FIG_1
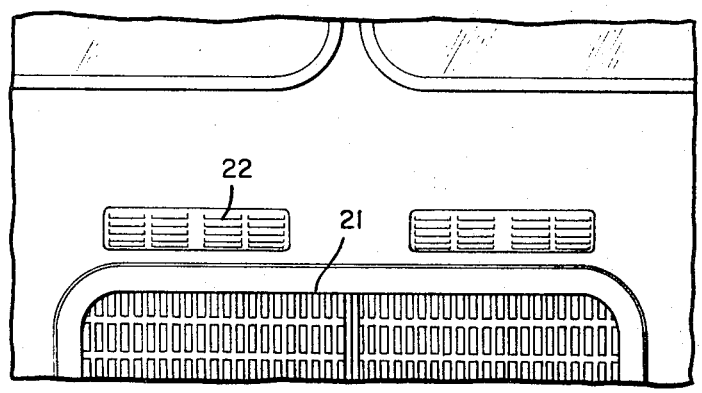
FIG_2
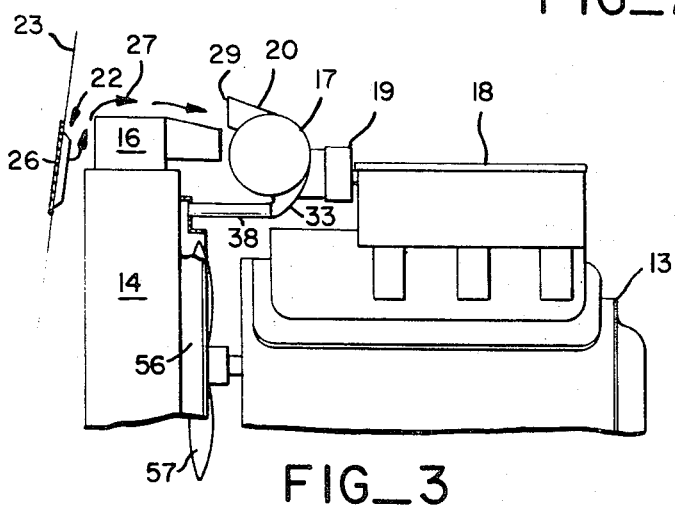
FIG_3
*INVENTOR.*
ROBERT L. EVENS
DOUGLASS H. LEWIS
BY NORMAN B. CHEW
ATTORNEYS

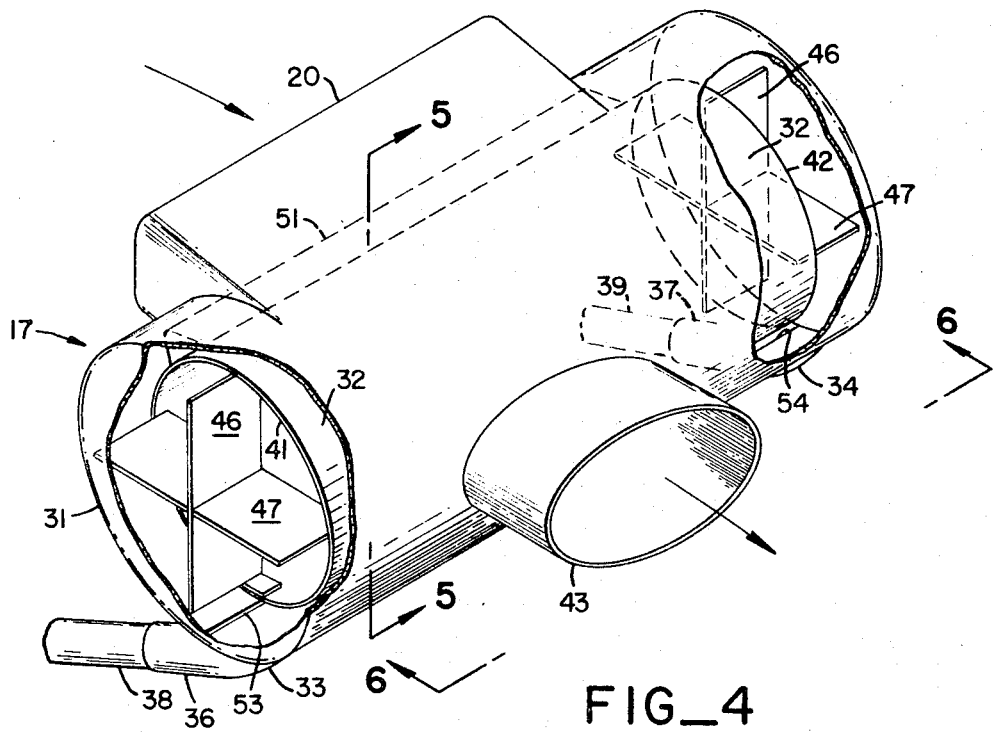
FIG_4
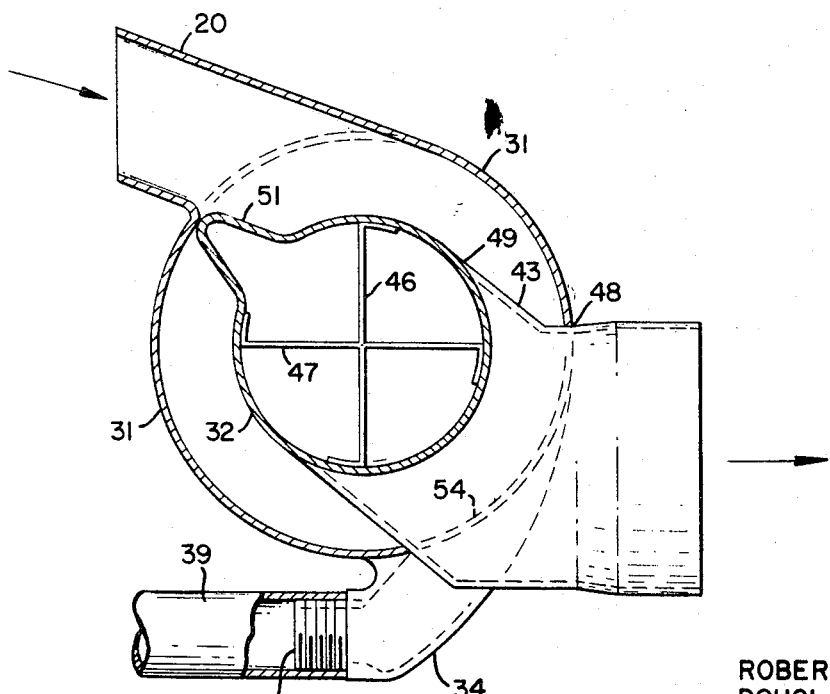
FIG_5

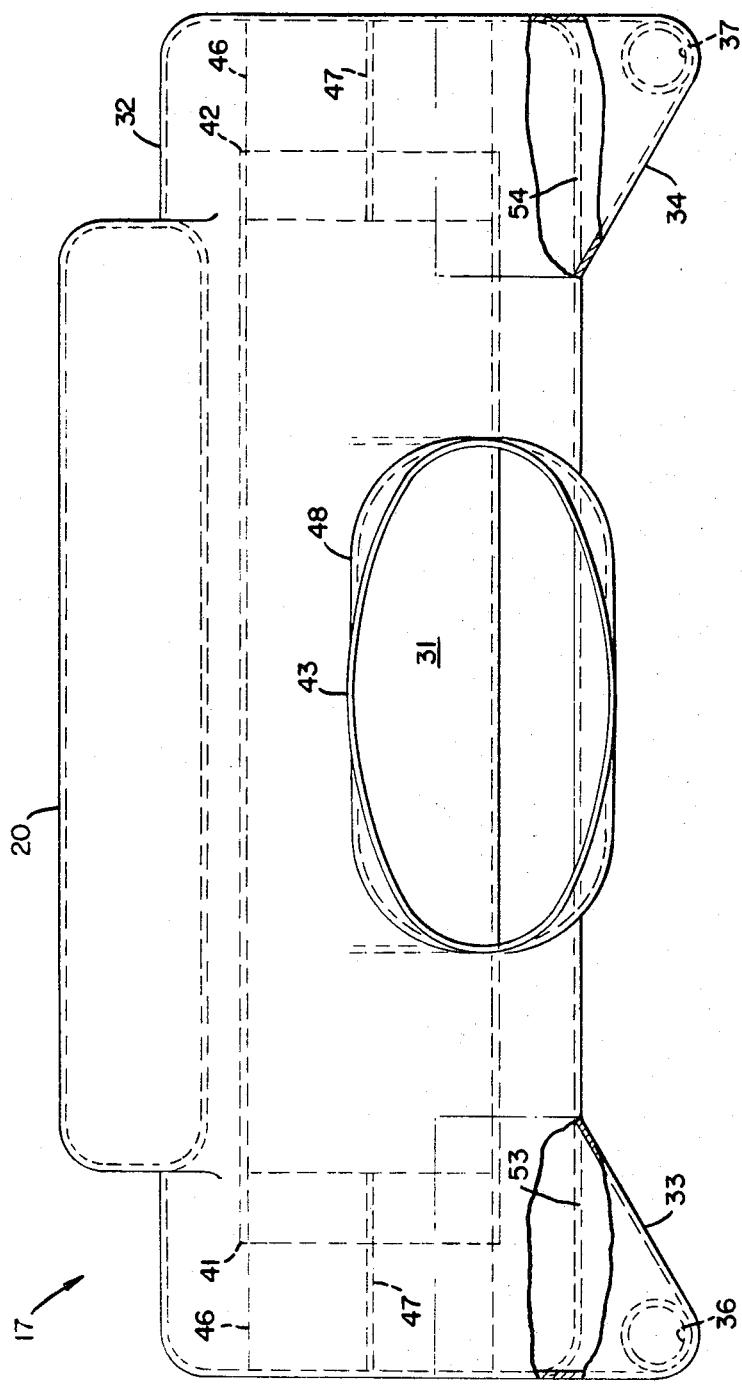
FIG_6

United States Patent Office 3,436,900
Patented Apr. 8, 1969

3,436,900
PRE-CLEANER ASSEMBLY FOR AIR
INDUCTION SYSTEM
Robert L. Evens, Beaverton, and Douglass H. Lewis and
Norman Bradford Chew, Portland, Oreg., assignors to
Freightliner Corporation, Portland, Oreg., a corporation
of Delaware
Filed Oct. 3, 1966, Ser. No. 583,849
Int. Cl. B01d 51/00
U.S. Cl. 55—385                                       1 Claim

ABSTRACT OF THE DISCLOSURE

An air induction system wherein a pre-cleaner is provided in front of the air cleaner of the engine. The pre-cleaner has contaminant pockets in the lower portion thereof wherein contaminants collect. There are exhaust duct means leading from the pockets to shroud means surrounding the radiator fan and at a place on the shroud means having a lower subatmospheric pressure than is effective within the pre-cleaner so that air from the pre-cleaner is drawn through the pockets to entrain the contaminants and carry them through the exhaust duct means into the shroud where the fan discharges them to the ambient air. The pre-cleaner is located at a level above the abovementioned place on the shroud means so that the exhaust duct means can extend from the pre-cleaner to such place without upward inclination. Also the exhaust duct means are smaller than the outlet of the pre-cleaner so that only a minor portion of the air is drawn through the pockets and into the shroud means.

---

This invention relates generally to a pre-cleaner assembly for use on an air induction system for internal combustion engines of the type used in private and commercial vehicles. More particularly, it relates to a pre-cleaner assembly for an air induction system for diesel engines.

Internal combustion engines must have air to support combustion. The air is provided by an air induction system. The air provided by an air induction system is preferably: (1) at a temperature which will support combustion with maximum efficiency; (2) free from contaminants such as dust, dirt, water, moisture, snow, ice, etc.; and (3) with a minimum of suction pressure. With diesel engines, it is of considerable importance to introduce air with a minimum of suction. The removal of large particles of contaminants before the air reaches the air cleaner extends the life of the air cleaner.

It is a general object of the present invention to provide an improved air induction system having a pre-cleaner assembly.

It is another object of the present invention to provide a pre-cleaner assembly for an air induction system which effectively separates out contaminants such as dust, water, dirt, moisture, snow, ice, etc.

It is a further object of the present invention to provide a pre-cleaner assembly for an air induction system in which contaminants are exhausted outside the vehicle before air is introduced into the engine.

It is another object of the present invention to provide a pre-cleaner assembly for an air induction system which makes use of existing engine assemblies, thereby reducing the cost of equipment.

The foregoing and other objects of the invention will become more clearly apparent from the following description taken in conjunction with the accompanying drawings.

Referring to the drawings:
FIGURE 1 is a side elevational view of a tilt cab tractor incorporating an air induction system with pre-cleaner assembly in accordance with the present invention;
FIGURE 2 is an enlarged view taken along lines 2—2 of FIGURE 1, showing the louvered air intake for the air induction system;
FIGURE 3 is a side elevational view showing an air induction system in which the pre-cleaner assembly is leading to an air filter housing;
FIGURE 4 is an isometric view with portions broken away, showing the preferred pre-cleaner assembly;
FIGURE 5 is a cross sectional view taken along lines 5—5 of FIGURE 4;
FIGURE 6 is a rear view of the pre-cleaner assembly taken along lines 6—6 of FIGURE 4.

As indicated in copending application Ser. No. 424,368, filed Jan. 11, 1965, now U.S. Patent 3,290,460, air is caused to flow through louvers formed in the front skin of the cab, directly in front of the radiator tank. The air flows over the top tank of the radiator and is captured by the induction system duct. The flow of air over the top tank pre-heats the air to minimize freezing in the air cleaner. The air induction system described in copending application, Ser. No. 424,568, filed Jan. 11, 1965, now abandoned, includes a series of baffles for the purpose of removing dense particles from the air stream.

In the present invention, the induction system duct includes a pre-cleaner assembly which serves to remove large particles of contaminants before the air is introduced into the air filter or other cleaner assembly for preparing the air to be introduced to the engine.

Referring to FIGURE 1, there is shown a tractor 11 including a tilting cab 12. The cab is shown tilted forward to expose the engine 13. The diesel engine 13 includes a radiator 14 disposed behind the front skin of the cab when the cab is in its closed position. Above the radiator 14 is a top tank 16. Adjacent to the top tank 16 is pre-cleaner assembly 17, which feeds to the air cleaner 18 through a duct 19. The air cleaner 18 may take the form shown in the drawing of a dry type air cleaner, or, alternatively, air cleaner 18 may be the oil bath type. As shown, duct 19 between the pre-cleaner assembly and the air cleaner may be a rubber hose or any suitable ducting means.

As part of the pre-cleaner assembly 17, intake 20 is shown in FIGURE 1 as placed immediately adjacent to the tank 16. Any suitable location may be chosen for the intake 20, although we prefer to place it as close as possible to the tank 16 to obtain pre-heating of the intake air.

Referring generally to FIGURE 2, the front of the tractor includes the radiator grill 21 and an air intake opening 2 provided with a grill which may be in the form of louvers, as shown. The opening 22 is located generally in front of the top tank of the radiator. Air flows towards the top tank and upwardly over the tank where it is sucked into the intake 20. The louvers may be arranged whereby the air flowing inwardly initially travels downwardly, then reverses direction to travel upwardly past the front of the tank and over the top of the tank. The changes in direction of air flow cause particles to separate out since they tend to travel in a straight line due to their momentum.

Referring more particularly to FIGURE 3, there is shown a portion of the cab skin 23 which is provided with a louvered opening 22. The louvers 26 are directed downwardly. Initially, the air travels downwardly as indicated by the arrow 27. Some of the air then travels upwardly, as shown by arrow 27, and over the radiator top tank 16. Suction at the open end 29 of the intake 20 serves to draw the air into the intake. When the vehicle is in motion, there may be a positive pressure creating a ram effect in the intake 20.

Referring to FIGURE 4, the pre-cleaner assembly is cylindrical in configuration to make use of centrifugal force, as will be presently explained. It will be seen that the pre-cleaner assembly 17 comprises a pair of generally concentric cylindrical surfaces 31 and 32. The larger cylinder, 31, receives the intake 20. At the bottom of the cylinder 31 two dirt collecting pockets 33 and 34 are located. Pockets 33 and 34 are simply extensions added to the ends of the lowermost portions of the cylinder 31 which is disposed horizontally. Dirt collecting pockets 33 and 34 attached to cylinder 31, for example by welding, and are entered through openings 53 and 54. From the respective pockets 33 and 34, exhaust ports 36 and 37 remove collected dirt particles through the associated tubes 38 and 39.

As shown in FIGURE 4, the inner cylinder 32 contains three openings: one at each of the ends 41 and 42 of the cylinder and one at outlet 43. Outlet 43 conducts clean air through duct 19 into the air cleaner 18 (FIGURES 1 and 3). It will be seen that the dirty air entering intake 20 is forced into a circular motion in the space between cylinders 31 and 32. This circular motion causes the denser dirt particles to be forced against the inner surfaces of cylinder 31 by centrifugal force. The less dense air, on the other hand, more readily continues its path into the ends of cylinder 32. Dirt particles are thrown to the bottom of cylinder 31 and collect in the pockets 33 and 34. Contaminants are then exhausted through ports 36 and 37 into tubes 38 and 39.

Clean air enters cylinder 32 through its ends 41 and 42 and exhausts through outlet 43 into the air cleaner. By not having the dense contaminant particles in the air stream, the air cleaner lasts longer. In addition, less frequent service is required. Large particles tend to block the air cleaner, whether it is a dry or oil type. It will be noted that cylinder 32 is shown in FIGURE 5 as considerably shorter in length than cylinder 31. The difference in length permits a relatively large volume of air to pass from cylinder 31 into cylinder 32. To aid in preventing dirt particles from passing into cylinder 32, blades 46 and 47 are placed in the space between the ends of the cylinders 31 and 32. In the embodiment shown in FIGURE 5, blades 46 and 47 extend at right angles to one another across the diameter of cylinder 32. Blades 46 and 47 are affixed to cylinder 32 in any convenient manner, as by rivets or by welding.

Cylinder 32 is suspended within cylinder 31 in such a manner as to provide adequate space for the flow of air. Support for cylinder 32 from below comes from outlet 43, which is welded or otherwise connected to both cylinders 31 and 32 at junctions 48 and 49. In addition to support provided by outlet 43 at the center of cylinder 32, bracket 51 (FIGURE 5) is welded both to cylinder 31 and cylinder 32 to maintain the proper spacing between them.

Contaminant exhaust ports 36 and 37 are located at the lowermost portions of the outer cylinder 31 in order to take full advantage of the effect of gravity on the contaminant particles.

While the above described pre-cleaner assembly consists of two concentric cylinders, it will be apparent that other configurations are possible and that containers having other shapes would be suitable. For example, a container employing an ellipsoid surface imparts a circular motion to the air and thereby separates contaminants by centrifugal force. Containers having cylindrical surfaces are preferred so that the centrifugal force holds the contaminant particles against the inner surface of the outer container while clean air proceeds to the inner container. However, containers having planar surfaces may be used so long as contaminants are removed from the system and do not bounce back into the air stream.

Two containers should be used, one disposed within the other and substantially freely supported so that pockets for the collection of dirt are not present other than the pockets adjacent to the exhaust ports.

The dirt from pockets 33 and 34 (FIGURE 4) passes through ports 36 and 37, respectively, and through the shroud 56 (FIGURE 3) disposed around the fan 57 of the internal combustion engine. The shroud 56 is adjacent to the radiator 14. Fan 57 of the internal combustion engine draws air from the space within the shroud 56. In so doing, a vacuum is created in the space forward of the shroud 56. The vacuum within the fan shroud is greater than the vacuum in the pre-cleaner pockets 33 and 34 which causes a small amount of air to travel from the pocket to the shroud through tubes 38 and 39. This small amount of air carries the dirt collected in the pocket to the engine fan shroud 56 which it is ejected into the engine fan air stream and blown through the engine compartment to the outside of the vehicle.

We have found that the greatest vacuum behind the fan shroud 56 is at a point directly over the hub of fan 57 at the closest point to the fan opening. It is essential that the tubes 38 and 39 enter the fan shroud 56 at a point where the absolute pressure within the shroud is less than the absolute pressure within pockets 33 and 34 so that contaminants will be exhausted from the assembly. We have found that there are places within the shroud where the vacuum is lower than that of the pre-cleaner pockets 33 and 34 which would cause the air to flow in the wrong direction and cause the contaminants to re-enter the air stream. While we prefer to have the tubes 38 and 39 enter the shroud at a point approximately in the 12 o'clock position with respect to the fan 57, any suitable location may be selected so long as the relative pressure in the shroud is less than that within the pockets 33 and 34.

As seen in FIGURE 3, the air is pre-heated by the radiator top tank whereby to minimize any possibility of icing of the filter or air cleaner due to moisture in the frontal air. It has been found that there is a greater tendency toward icing in dry filters. The amount of preheating must be relatively low to assure that there is a good fuel to air by weight of oxygen ratio and yet high enough to prevent freezing due to the expansion of the air in the air cleaner. It has been found that about 6° to 8° F. of preheating suffices. The amount of preheating can be controlled by controlling the position of the lower lip of intake 20 at the top tank so that the air is in less or more heat exchange relationship with the top tank or by applying insulating material to the top tank to again control the heat exchange relationship.

Thus, it is seen that there is provided a pre-cleaner assembly for an air induction system which effectively removes dirt particles by the use of centrifugal force. The pressure of the air entering the air cleaner for the internal combustion engine is not substantially reduced in pressure. The air is slightly preheated when supplied to the air filter system of the vehicle. The internal combustion engine is supplied clean and conditioned air with a minimum of suction pressure and at a slightly elevated temperature which increases the efficiency of the engine. By having conditioned air which is free of dust, dirt, water, moisture, snow, ice, etc., the life of the internal combustion engine is prolonged and the engine operates at maximum efficiency.

We claim:

1. An air induction system including a water cooled internal combustion engine of a vehicle having a radiator forwardly of the engine for cooling the water used to cool the engine, said engine having an intake manifold, an air cleaner on said engine connected to the intake manifold for cleaning air passing through said air cleaner into said intake manifold, said engine operating to create a subatmospheric pressure in said intake manifold to draw air through said air cleaner, a pre-cleaner for said engine disposed between said radiator and said air cleaner including means for cleaning the air, said pre-cleaner having a forwardly directed inlet for receiving ambient air, and an outlet connected to said air cleaner for delivering air to said air cleaner, the subatmospheric pressure created by said engine being effective at the pre-cleaner outlet to draw air through said pre-cleaner and into said air cleaner, said pre-cleaner having pocket means in the lower portion thereof to collect part of the contaminants in the incoming air, there being a fan rearwardly of said radiator for drawing air through said radiator, shroud means surrounding said fan whereby said fan creates a subatmospheric pressure within said shroud means, said shroud means having a place where the subatmospheric pressure is a maximum, exhaust duct means extending from said contaminant pocket means and connected to said shroud means at said place, said pre-cleaner being located at a level at least equal to that of said place on said shroud means so that said exhaust duct means can extend from said pre-cleaner to said place on said shroud means without substantial upward inclination, said shroud means and fan being so constructed that the subatmospheric pressure created at said place on said shroud means is greater than the subatmospheric pressure created in the outlet of said pre-cleaner by said engine, whereby air is drawn through said pocket means and exhaust duct means into the space defined by said shroud means whereby such air entrains the contaminants in said pockets facilitating their discharge into the space within said shroud means there to be blown by the fan over the engine and out to the ambient air, said duct means being smaller than the outlet of said pre-cleaner so that only a minor portion of the air entering said pre-cleaner is drawn through said duct means, leaving the major portion for passage into said air cleaner and intake manifold.

References Cited

UNITED STATES PATENTS

| | | | |
|---|---|---|---|
| 1,443,859 | 1/1923 | Allen et al. | |
| 1,842,082 | 1/1932 | Edridge | 55—448 |
| 2,197,503 | 4/1940 | Martin. | |
| 2,688,378 | 9/1954 | Perrin | 55—396 |
| 2,708,920 | 5/1955 | Pasturczak | 55—385 |
| 2,790,508 | 4/1957 | Allander et al. | 55—345 |
| 3,077,716 | 2/1963 | Wilson | 55—448 |
| 3,137,553 | 6/1964 | Billey | 55—468 |
| 3,232,368 | 2/1966 | Sullivan | 55—385 |
| 3,304,697 | 2/1967 | Ramsey | 55—459 |
| 1,689,104 | 10/1923 | Bennett | 55—397 |
| 1,244,442 | 10/1917 | Frazer | 60—30 |
| 2,069,379 | 2/1937 | Moe. | |
| 2,808,893 | 10/1957 | Dorman et al. | |

FOREIGN PATENTS

| | | |
|---|---|---|
| 521,847 | 6/1940 | Great Britain. |
| 974,415 | 11/1964 | Great Britain. |

HARRY B. THORNTON, *Primary Examiner.*

B. NOZICK, *Assistant Examiner.*

U.S. Cl. X.R.

55—452, 459, 468